(12) United States Patent
Mendoza et al.

(10) Patent No.: US 6,599,629 B2
(45) Date of Patent: *Jul. 29, 2003

(54) COATED NATURAL LEATHER HAVING LOW DEFORMATION

(75) Inventors: Yery A. Mendoza, Geneva (CH); Eleni Karayianni, Geneva (CH)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/196,051

(22) Filed: Jul. 15, 2002

(65) Prior Publication Data

US 2003/0012960 A1 Jan. 16, 2003

Related U.S. Application Data

(63) Continuation-in-part of application No. 09/840,800, filed on Apr. 24, 2001, which is a continuation-in-part of application No. 09/565,353, filed on May 5, 2000, now abandoned.

(51) Int. Cl.$^7$ .................. B32B 27/40; B32B 27/04; B32B 27/06
(52) U.S. Cl. ............... 428/423.4; 8/94.1 R; 427/389; 428/506.6; 428/319.3
(58) Field of Search .................. 428/423.4, 306.6, 428/319.3; 427/389; 8/94.1 R

(56) References Cited

U.S. PATENT DOCUMENTS

| | | | | |
|---|---|---|---|---|
| 3,027,276 A | | 3/1962 | Cohen et al. ............... 528/59 |
| 4,066,818 A | * | 1/1978 | Junge et al. ............... 428/341 |
| 4,401,801 A | * | 8/1983 | Pedain et al. ............... 528/67 |
| 4,601,951 A | * | 7/1986 | Fertell et al. ............ 428/423.4 |
| 5,932,056 A | | 8/1999 | Mark et al. ............... 156/266 |

FOREIGN PATENT DOCUMENTS

| | | |
|---|---|---|
| DE | 1469530 | 11/1972 |
| FR | 866856 | 9/1941 |
| FR | 1589164 | 9/1968 |
| FR | 2116822 | 6/1972 |
| FR | 2129056 | 10/1972 |
| RO | 104707 | 11/1994 |

* cited by examiner

*Primary Examiner*—Rabon Sergent

(57) ABSTRACT

Coated natural leather, prepared from natural leather having polyurethane coated on its flesh side and having an improved (decreased) measure of deformation, is provided.

10 Claims, No Drawings

COATED NATURAL LEATHER HAVING LOW DEFORMATION

CROSS REFERENCE TO RELATED APPLICATION

This application is a continuation-in-part of U.S. patent application Ser. No. 09/840,800 filed Apr. 24, 2001, which is a continuation-in-part of U.S. patent application Ser. No. 09/565,353, filed May 5, 2000, now abandoned.

BACKGROUND OF THE INVENTION

1. Field of the Invention

This invention relates to coated natural leather and, more particularly, to leather coated on the flesh side with polyurethanes or polyurethaneureas.

2. Description of Background Art

Coatings are generally applied to natural leathers on the grain side of the leather for aesthetic, waterproofing, or durability purposes. Although some applications of polymers to the flesh side of leather have been disclosed, the results have not been satisfactory with regard to stretch and recovery.

French Patent Number 2,129,056 discloses a method for reinforcing leather by coating the flesh side with a rigid, crosslinked polyurethane elastomer, the polymer being formed in situ on the leather. Shoes made from the coated leather are also disclosed but, because the polymer is rigid, neither the leather nor the shoes made therefrom have the desirable stretch and recovery needed for comfortable wear.

German Patent Number 1,469,530 discloses a process for impregnating an unspecified side of natural leather with a solution of an irreversibly heat-hardenable resin (e.g. polyurethane), followed by deep-drawing or vacuum-shaping and heating to a permanent form having shape stability. Leather processed in this way will not have a desirable combination of stretch and low set, because it will be hardened into a permanent form.

French Patent Number 866,856 discloses coating the flesh side of dyed leather with dilute solutions of chlorinated rubber to bind leather dust to the leather. The properties of the leather, however, are not affected by this treatment.

Romanian Patent Number 104,707 discloses the use of crosslinkable polyurethane prepolymers to coat a variety of materials, but specifics of their application to leather are not disclosed.

U.S. Pat. No. 3,027,276 discloses lightly spraying a thin, low-solids solution of a diisocyanate prepolymer onto the flesh side of dyed or pigmented suede containing free moisture to prevent crocking. In this method, curing is completed on the leather by reaction with environmentally available water. This method does not alter the mechanical properties of the treated suede.

U.S. Pat. No. 5,932,056 discloses a method of laminating a one-way stretch fabric in alignment with natural leather, but such laminates can be too thick for some uses.

French Patent Number 1,589,164 discloses reinforcing the back of thin or split skins by coating the flesh side of leather with an aqueous emulsion of thermoplastic acrylic and vinyl polymers without significant penetration of the leather. The abrasion and water resistance of the leather is improved. However, such a coating will not provide sufficient recovery to avoid permanent distortion after the coated leather is highly stretched.

A combination of high stretch (for comfort and ease of shaping), low set (for shape retention), high air permeability, and visual aesthetics of natural leather is still needed.

SUMMARY OF THE INVENTION

The coated natural leather of the present invention comprises (a) natural leather having at least about 15% elongation prior to coating; and (b) 5–70 wt %, based on the weight of uncoated leather, of elastomeric polyurethane, from a polyurethane solution having a viscosity of 1,000–300,000 centipoise, coated on the flesh side of the leather which is capable of absorbing the polyurethane solution, wherein the coated leather has an elongation of at least about 15%, a set of no more than about 25%, and a measure of deformation (ratio of fifth cycle set to fifth cycle elongation) at least 0.05 lower than the uncoated leather.

DETAILED DESCRIPTION OF THE INVENTION

It has now been discovered that natural leather which has been coated on the flesh side with a solution of an elastomeric polyurethane has low percent set relative to its elongation. This unexpected combination of properties means that the coated leather retains its softness and stretch (for comfort) but resists permanent deformation for good fit retention. It has also been discovered that the solution-coated leather retains surprisingly high elongation and low set after extended storage. Further, the polyurethane solution-coated leather of the invention displays highly desirable soft-leather tactile aesthetics on the (coated) flesh side. The coated leather of the invention can be made into articles such as footwear, apparel such as jackets and pants and apparel accessories such as purses, belts and gloves, upholstery, and luggage.

As used herein, "natural leather" means the tanned or partially tanned skin of any suitable animal. "Flesh side" means the inside of the leather or skin when it is still part of the animal, and "grain side" means the outside of the leather or skin when it is still part of the animal. When the leather is a split-grain leather, "split side" means the side that was within the leather or skin before it was split. By "coated on the flesh side" is meant coating the flesh side of full grain (un-split) leather or the split side of split grain leather. "Set" means the percent residual extension of a measured length of coated or uncoated leather after it has been stretched at a force of 17.5 Newtons per centimeter (N/cm, of sample width) at room temperature and allowed to relax to substantially zero force.

Elastomeric polyurethanes useful in this invention can be prepared by reacting a polymeric glycol with a diisocyanate to form a capped glycol, dissolving the capped glycol (in a suitable solvent), and then reacting the capped glycol with a difunctional chain extender having active hydrogen atoms. Such polyurethanes are termed "segmented" because they are comprised of "hard" urethane and urea segments derived from the diisocyanate and chain extender and "soft" segments derived primarily from the polymeric glycol. Suitable solvents for preparing solutions of such polymers are amide solvents such as dimethylacetamide ("DMAc"), dimethylformamide ("DMF"), and N-methylpyrrolidone, but other solvents such as dimethylsulfoxide and tetramethylurea can also be used.

Polymeric glycols used in the preparation of the elastomeric polyurethanes include polyether glycols, polyester glycols, polycarbonate glycols and copolymers thereof. Examples of such glycols include poly(ethyleneether)

glycol, poly(trimethyleneether) glycol, poly(tetramethyleneether) glycol, poly(tetramethylene-co-2-methyl-tetramethyleneether) glycol, poly(ethylene-co-butylene adipate) glycol, poly(2,2-dimethyl-1,3-propylene dodecanedioate) glycol, poly(3-methyl-1,5-pentamethylene dodecanedioate) glycol, poly(pentane-1,5-carbonate) glycol, and poly(hexane-1,6-carbonate) glycol.

Useful diisocyanates include 1-isocyanato-4-[(4'-isocyanatophenyl)methyl]benzene, 1-isocyanato-2-[(4'-isocyanato-phenyl)methyl]benzene, isophorone diisocyanate, 1,6-hexanediisocyanate, and 2,4-tolylene diisocyanate, and mixtures thereof.

The chain extender can be a diol or a diamine. Useful diols include ethylene glycol, 1,3-trimethylene glycol, 1,4-butanediol, and mixtures thereof. Diol chain extenders lead to polyurethanes. Useful diamines include ethylene diamine, 1,2-propanediamine, 2-methyl-1,5-pentanediamine, 1,3-diaminopentane, 1,4-cyclohexane-diamine, 1,3-cyclohexanediamine, and mixtures thereof. In this case, the polymer produced is a polyurethaneurea. When a polyether glycol and a diamine chain extender are utilized, the polymer produced is a polyetherurethaneurea; when a polyester glycol is utilized in combination with a diamine chain extender, a polyesterurethaneurea is produced. Monofunctional amine chain terminators such as diethyl amine, butylamine, cyclohexylamine, and the like can be added to control the molecular weight of the polymer.

Additives, for example, antioxidants and lubricants, can be added in small quantities to the polyurethane coating solution, provided such additives do not detract from the benefits of the invention.

Leather from sheep, goat, cattle, calf, pig, ostrich, kangaroo, elephant, deer, lizard, crocodile, snake, and the like can be used in the present invention. The characteristics of natural leather can vary greatly depending on the animal source, the part of the animal it has been taken from, and the method of tanning. In the event the natural leather does not have adequate stretch (at least about 15% elongation, at 17.5 Newtons per centimeter applied force), the desirably high elongation of the coated leather of the invention cannot be obtained.

In the present invention, the elastomeric polyurethane coating comprises about 5–70% polyurethane by weight of uncoated leather; preferably about 15–55 wt %. At 17.5 Newtons per centimeter applied force, the coated leather has an elongation of approximately at least about 15% and preferably at least about 20% and a set of approximately no more than about 25%, preferably no more than about 20%. The coated leather of this invention must have a measure of deformation (ratio of fifth cycle set to fifth cycle elongation) of at least approximately 0.05 better (lower) than the uncoated (control) leather and, preferably, a measure of deformation value approximately no more than about 0.5.

The viscosity of the polyurethane solution can influence the degree of penetration of the polymer into the leather and the amount of polymer deposited. When viscosity is too low, insufficient amounts of elastomer can be deposited in the leather and excessive penetration to the grain side of the leather can occur. When solution viscosity is too high, penetration of the solution into the leather can be reduced, thereby inhibiting bonding of the elastomer to the leather. This can reduce the improvement in the set of the leather of this invention provided by the elastomer. The solution of elastomeric polyurethane to be coated onto the natural leather has a solution viscosity of approximately 1,000–300,000 centipoise ("cPs"), preferably 5,000–200,000 cPs, as measured at about 22° C.

When natural leather (including full-grain, suede, nubuck and split-grain leather) is coated with polyurethane only on the flesh side, the grain (face) side will retain its natural grain (or, in case of suede and nubuck, its brushed) look and feel. (This face side can be sanded and/or brushed to achieve nubuck or suede appearance.) However, leather can also be coated with a polyurethane solution on both the flesh and grain sides if modification of the appearance and feel of the grain (face) side is desired, provided the desirable elongation and set characteristics of the coated leather are not deleteriously affected.

It is necessary for the leather to be coated in the present invention to be able to absorb a polyurethane solution. Therefore, no treatment, such as coating or drying, can be carried out that can restrict the penetration of the polyurethane into the leather excessively. The leather can be chrome-tanned or vegetable tanned, and it can be dyed.

The natural leather to be utilized in this invention can be of any thickness. Thicker leather can require more elastomer to be deposited and longer coating times to allow the polymer solution to penetrate the leather than thin leather, which is preferred for some uses due to its softness and stretchability. As an example of a suitable thin leather, the bovine leather used in ladies' dress shoe uppers is generally in the range of about 0.8–1.0 mm thickness.

The process of the present invention for manufacturing coated leather comprises the steps of providing natural leather having at least about 15% elongation and being capable of absorbing polyurethane solution; coating an elastomeric polyurethane solution, viscosity of about 1,000–300,000 cPs, preferably 5,000–200,000 cPs (measured at about 22° C.) onto the flesh side of the leather; and drying the coating such as by evaporating the solvent, preferably at no higher than about 75° C., wherein the coating on the coated leather comprises approximately 5–70 wt %, based on the weight of the uncoated leather.

The polyurethane solution can be applied at the "wet blue" stage of tanning, that is after chrome tanning and before retanning, coloring, or fatliquoring, drying, etc. Some polyurethane, however, can be lost during subsequent processing, with consequent increase in the set. Application of polyurethane at the early stages of the tanning operation is preferably done after the leather has been split to the desired thickness. Prewetting the side of the leather to be coated with the solvent utilized in the preparation of the polyurethane solution can help adhere the polymer to the leather.

Any suitable method of coating the polyurethane solution onto the leather can be used. In general, the thickness of the coating can be controlled by utilizing a coating implement held at a predetermined distance above the leather. The solution can also be mechanically pressed into the flesh side of the leather, thus improving the bond between the elastomeric polyurethane and the leather and, also, between different portions of the subsequently dried coating. Rollers, platens, scrapers, knives, and the like can be used in the process of this invention as coating implements, as well as coating machines such as those ordinarily used in processing leather. Spraying the solution onto the flesh side of the leather can be effective, especially if the force of the spray is sufficient to result in good penetration and bonding.

It can be advantageous deliberately to leave portions of the leather surface uncoated to improve the porosity of the coated leather. For example, a periodically or randomly interrupted coating can be desirable to generate a variety of patterns, such as a net pattern. The porosity of the coated leather can also be improved by lightly brushing the coated side, for example with a wire brush.

Depending on the natural leather being used, shrinkage of the leather can occur during the removal of solvent from the coated leather, with consequent deterioration of the aesthetics of the coated leather. In such circumstance, solvent can be evaporated while the coated leather is held under low but sufficient tension to prevent such shrinkage. If too much tension is applied, the leather can become excessively stretched, which can result in loss of elongation in the coated leather. Drying the coated leather at too high a temperature can adversely affect the leather by degrading it, and the polyurethane solution can be driven through to the grain side. It is preferred that drying temperatures no higher than about 75° C. be used in the process of the invention.

In Examples 1–4, the polymer source for the polyurethane solution was chopped LYCPA® Type 136C spandex (a polyetherurethaneurea-based spandex; a registered trademark of E.I. du Pont de Nemours and Company). Unless otherwise noted, a Rotolab 400 coater was used to coat the solution onto the flesh side of the leather (Gemata S.P.A., Trissino, Italy). The coating roll had a recessed patterned surface, increasing the amount of polyurethane coated onto the leather.

In all Examples, the polymer solution was coated onto the flesh side of the leather, leaving the grain side of the leather uncoated; coating wt % is based on the weight of uncoated leather.

Unless otherwise noted, the elongation and set of uncoated and coated leather were measured using an Instron instrument (Instron Ltd., High Wicomb, UK) and Instron Series XIII software was used during five stretch-and-relax cycles. The measurements were made on the long direction of 2 cm×10 cm samples. The 10-cm length corresponded to the high-stretch direction of the leather. Elongation (%) values were recorded at an applied force (stress) per unit sample width of 17.5 Newtons per centimeter (N/cm) on the stretch part of the fifth stretch-and-relax cycle. Elongation of uncoated leather was measured on samples adjacent to that portion of the leather from which samples were cut out for coating. Set (%, residual elongation) was measured by stretching the leather at room temperature to 17.5 N/cm applied force and allowing it to relax. The final, relaxed length of the leather sample was measured immediately after relaxation to zero applied force. Set was calculated as follows:

Set (%)=relaxed length−initial length×100/initial length

Relaxed length was measured immediately after the fifth stretch-and-relax cycle.

To be a coated leather of this invention, the measure of its deformation must be lower than that of the uncoated leather (control) by at least about 0.05 unit. The greater the potential elongation in the leather, the more susceptible it can be to high set. This ratio of set to elongation is reported in the Tables as a dimensionless number.

In the Examples, the permeability to air of the coated leather was measured with a TEXTEST Fx 3300 calibrated anemometer (Textest AG, Zurich, Switzerland) using an air pressure of 600 Pa on a 20-cm² area of the leather and was reported in liters/m²/second and solution viscosities were measured at 22° C. (unless otherwise stated) with a Brookfield Digital Viscometer, Model DV-II.

EXAMPLE 1

Chopped spandex, 125 g, was dissolved with vigorous mechanical agitation in 1 liter of dimethyl formamide (DMF) containing 1.25 g of dibasic ammonium phosphate to aid dissolution. The resulting solution was protected from contact with the air by covering the vessel with parafilm. After several hours of agitation, the solution had a Brookfield viscosity of about 7500 cPs, as measured at 21° C. and 60% relative humidity. A sample of calf leather, 0.9-mm thick, was chrome-tanned and dyed black. It weighed 81.0 g and had 25–30% elongation. The leather was coated on the flesh side with the polyurethaneurea (PU) solution. The coated leather was then allowed to dry at room temperature in a horizontal position. After 24 hours, the dried leather weighed 88.5 g, which represented a 9.2 wt % polymer coating, based on uncoated leather weight. The coated leather was tested as described above. The results are given in Table I.

TABLE I

|  | Elongation (%) @ 0 N/cm (5th cycle start) | Elongation (%) @ 17.5 N/cm | Set (%) | Air Permeability (1/m²/s) | Measure of Deformation |
|---|---|---|---|---|---|
| Uncoated leather | 10 | 20 | 12 | 3.1 | 0.60 |
| Coated leather | 9 | 35 | 17 | 2.7 | 0.49 |

As can be seen from Table I, set is well controlled in the coated leather of this invention, when considered in relation to its surprisingly high elongation. The measure of deformation was significantly lower (by 0.11) for the coated (0.49) leather of this invention than for the uncoated (0.60) control sample outside of the invention.

EXAMPLE 2

Tanned hair sheep leather about 1-mm thick and having about 40% elongation was coated on the flesh side with a solution containing 12.5 wt % polyurethaneurea dissolved in DMF. The viscosity of the solution was 120,000 cPs. The coated leather was allowed to dry at room temperature, resulting in a coating weight of 6.9%, based on the weight of the uncoated leather. After drying, the sample was somewhat stiff, so it was manually bent and stretched for about ½ minute. Its properties were then measured and reported in Table II.

TABLE II

|  | Elongation (%) @ 0 N/cm (5th cycle start) | Elongation (%) @ 17.5 N/cm | Set (%) | Air Permeability (1/m²/s) | Measure of Deformation |
|---|---|---|---|---|---|
| Uncoated leather | 56 | 79 | 64 | 3.9 | 0.81 |
| Coated leather | 9 | 25 | 12 | 2.7 | 0.48 |

The data in Table II again show the advantage achieved by the coated leather of this invention; measure of deformation having been improved (lowered) by 0.33.

EXAMPLE 3

Chopped spandex (37.5 g) was dissolved in 500 ml of DMF to give a 7.5wt % solution of polyurethaneurea. Dibasic ammonium phosphate (3.5 g) and formaldehyde (1 ml) were added to assist in dissolving the fiber. The viscosity of the solution was about 1200 cPs. A sample of tanned calf leather having 30% elongation was coated on the flesh side with the polyurethaneurea solution and dried, resulting in a coating weight of 5% polyurethaneurea. Test results are given in Table III.

TABLE III

|  | Elongation (%) @ 0 N/cm (5th cycle start) | Elongation (%) @ 17.5 N/cm | Set (%) | Measure of Deformation |
|---|---|---|---|---|
| Uncoated leather | 8 | 25 | 16 | 0.64 |
| Coated leather | 5 | 22 | 11 | 0.50 |

Again, as can be seen from Table III, polyurethaneurea coating of this invention effectively reduces the set of coating leather to afford an improvement in the measure of deformation of 0.14.

EXAMPLE 4

A DMF solution containing 15 wt % polyurethaneurea was prepared from chopped spandex, 1 wt % of basic ammonium phosphate (based on the weight of the polyurethaneurea), and 1 ml of formaldehyde. The viscosity of the solution was 58,500 cPs. A sample of tanned hair sheep leather about 1-mm thick and having up to 40% elongation was coated on the flesh side with the polyurethaneurea solution and then dried resulting in a coating weight of 18%, based on the weight of the uncoated leather. Test data are given in Table IV.

TABLE IV

|  | Elongation (%) @ 0 N/cm (5th cycle start) | Elongation (%) @ 17.5 N/cm | Set (%) | Measure of Deformation |
|---|---|---|---|---|
| Uncoated leather | 36 | 50 | 40 | 0.80 |
| Coated leather | 25 | 50 | 32 | 0.64 |

As can be seen from the above data, although the absolute values were high, the measure of deformation was lowered by 0.16.

EXAMPLE 5

Comparison

A 20-wt % solution of NORDEL® Type 1320 US (a registered trademark of E.I. du Pont de Nemours and Company for its ethylene/propylene/butadiene elastomer resin, in hexane was coated onto the flesh side of a sample of tanned calf leather. The viscosity of the solution was 880 cPs. After drying, the coated leather had 4.6 wt % polymer based on the weight of the uncoated leather. Results of tests conducted as described above are given in Table V.

TABLE V

|  | Elongation (%) @ 0 N/cm (5th cycle start) | Elongation (%) @ 17.5 N/cm | Set (%) | Measure of Deformation |
|---|---|---|---|---|
| Uncoated leather | 8 | 25 | 16 | 0.64 |
| Coated leather | 11 | 22 | 14 | 0.64 |

As can be seen from the data in Table V, the ethylene/propylene/butadiene elastomer resin of Example 5 was ineffective in controlling set and lead to coated leather with high measure of deformation which was unimproved over the uncoated control.

EXAMPLE 6

Comparison

A sample of tanned calf leather was coated on the flesh side with a 15 wt % toluene solution of ELVAX® 260 resin [a registered trademark of E.I. du Pont de Nemours and Company for its poly(ethylene-co-vinyl acetate) polymers, outside of this invention]. The solution viscosity was 1200 cPs. The weight of the coating on the dried leather was 4.9%, based on the weight of the uncoated leather. Results of tests conducted as described above are shown in Table VI.

TABLE VI

|  | Elongation (%) @ 0 N/cm (5th cycle start) | Elongation (%) @ 17.5 N/cm | Set (%) | Measure of Deformation |
|---|---|---|---|---|
| Uncoated leather | 8 | 25 | 16 | 0.64 |
| Coated leather | 12 | 25 | 16 | 0.64 |

As can be seen from the data in Table VI, the poly(ethylene/vinyl acetate) leather coated with such polymers had high measure of deformation and did not improve the measure of deformation over uncoated leather.

EXAMPLE 7

A polyurethane solution was prepared by contacting poly (tetramethylene ether) glycol having a number-average molecular weight of 1800 with 1-isocyanato-4-[(4-isocyanatophenyl)methyl]benzene (1.7 mole ratio of diisocyanate to polymeric glycol) to form a capped glycol, dissolving the capped glycol in DMAc, and reacting the capped glycol with a mixture of ethylene diamine, 2-methyl-1,5-diaminopentane (80/20 mole ratio of diamines), diethylamine, and 1,1-dimethylhydrazine to form a polyurethaneurea solution. The following additives were stirred into the solution to give the indicated percentages, based on the weight of the total solids in the solution mixture: 1.5 wt % 2,4,6-tris (2,6-dimethyl-4-t-butyl-3-hydroxybenzyl) isocyanurate (Cyanox® 1790, Cytec Industries), 0.5 wt % of a polymer made from (bis(4-isocyanato-cyclohexyl)methane) and N-t-butyldiethanolamine (Methacrol® 2462, a registered trademark of E.I. du Pont de Nemours and Company), and 0.6 wt % silicone oil. The final solution had 22,000 cPs Brookfield viscosity with a #3 spindle.

A doctor knife was used manually to coat the mixture onto 1.1-mm thick tanned bovine leather samples which had been dyed blue. In preparation for testing, care was taken not to include parts of the samples that might not have been uniformly coated. Thus, portions of the leather were excluded where solution was being added or re-supplied to the 'box' of the doctor knife and where the doctor knife ran dry. Uncoated control samples were cut from the leather as close as possible to the respective samples intended for coating.

Two levels of polyurethane coatings were applied by using different doctor knives, and the results are presented in Table VII. After coating and drying, Sample A (10 wt % coating) was 1.3-mm thick, and Sample B (20 wt % coating) was 1.4-mm thick.

TABLE VII

|  | Uncoated Leather | | Coated Leather | |
| --- | --- | --- | --- | --- |
|  | Initial | 19 mo old | Initial | 19 mo old |
| Sample A |  |  |  |  |
| Elongation (%) | 40 | 29 | 39 | 35 |
| Set (%) | 30 | 17 | 21 | 9 |
| Measure of Deformation | 0.75 | 0.59 | 0.54 | 0.26 |
| Sample B |  |  |  |  |
| Elongation (%) | 36 | 29 | 34 | 29 |
| Set (%) | 26 | 17 | 13 | 4 |
| Measure of Deformation | 0.72 | 0.59 | 0.38 | 0.14 |

As can be seen from these data, coating leather with 10 and 20 wt %, respectively of polyurethane decreased the measure of deformation by 0.21 and 0.34, respectively. Further, after 19 months' storage in plastic bags (at about 22° C., 50–60% Relative Humidity) both solution-coated leather samples retained high elongation while exhibiting even lower set and measure of deformation, compared to their initial properties.

EXAMPLE 8

Example 7 was repeated, but with a 1.0-mm thick tanned goat leather that had been dyed gray and coated with 39 wt % (dried) polyurethane. Results are presented in Table VIII. The coated leather was 1.3-mm thick.

TABLE VIII

|  | Uncoated leather | Coated leather |
| --- | --- | --- |
| Elongation (%) | 36 | 36 |
| Set (%) | 23 | 14 |
| Measure of Deformation | 0.64 | 0.39 |

The data in Table VIII show that this level of polyurethane improved the measure of deformation by 0.25 and also gave a desirably low measure of deformation value.

EXAMPLE 9

Example 7 was repeated, but with a 1.0-mm (Sample A) and 1.1-mm (Sample B) thick tanned bovine leather that had been dyed red; 3 and 36 wt % of polyurethane, respectively, were applied. Coated Sample A was 1.1-mm thick, and coated Sample B was 1.4-mm thick. Test results are presented in Table IX.

TABLE IX

|  | Sample A (Comp.) | | Sample B | |
| --- | --- | --- | --- | --- |
|  | Uncoated leather | Coated leather | Uncoated leather | Coated leather |
| Elongation (%) | 35 | 31 | 35 | 35 |
| Set (%) | 22 | 19 | 23 | 14 |
| Measure of Deformation | 0.63 | 0.61 | 0.66 | 0.40 |

Table IX shows that leather coated with a 3 wt. % polyurethane solution showed practically no improvement (only 0.02,) over the uncoated leather, coupled with a high value of the measure of deformation. At 36 wt % polyurethane coating, the improvement over the uncoated control was 0.26.

EXAMPLE 10

The coating method of Example 7 was repeated using the same tanned blue bovine leather, but the polyurethane was prepared from poly(tetramethylene ether) glycol, number-average molecular weight of 1800, 1-isocyanato-4-[(4'-isocyanatophenyl)methyl]benzene (1.6 mole ratio of diisocyanate to polymeric glycol), and a mixture of ethylene diamine, 2-methyl-1,5-diaminopentane (90/10 mole ratio of diamines), and diethylamine. The additives were 3 wt % ZnO, 1.5 wt % Cyanox® 1790, 0.5 wt % Methacrol® 2462, and 1.5 wt % barium sulfate (wt % based on total solids of the final solution). The solution had Brookfield viscosity of 117,000 cps (spindle #3, Samples B, C, and D) and, when diluted for Sample A, of 5800 cps (spindle #3). The uncoated leather thicknesses were 1.2 mm (Sample A), 1.0 mm (Sample B), 1.2 mm (Sample C), and 1.1 mm (Sample D). Coated Samples A and B (1.3-mm and 1.1-mm thick, respectively) were prepared with a 20-mil (0.05 cm) doctor knife, and coated Sample C (1.3-mm thick), with a 50-mil (0.13 cm) doctor knife. Coated Sample D (1.4-mm thick) was coated a first time with a 50-mil (0.13 cm) doctor knife, allowed to dry for 24 hours, and then coated again with the same doctor knife. Polyurethane coating levels (wt %, after drying) were 16, 18, 52 and 70, respectively. Test results are summarized in Table X, for uncoated and coated samples, respectively.

TABLE X

|  | A | | B | | C | | D | |
| --- | --- | --- | --- | --- | --- | --- | --- | --- |
| Elon. (%) | 40 | 35 | 42 | 50 | 61 | 37 | 48 | 36 |
| Set (%) | 21 | 15 | 30 | 19 | 44 | 10 | 26 | 6 |
| Measure of Deformation | 0.51 | 0.42 | 0.70 | 0.38 | 0.73 | 0.26 | 0.54 | 0.16 |

The results in Table X showed acceptable decreases in the measure of deformation. The data for Sample B suggest that the high measure of deformation and set observed for the coated leather of Example 4 may have been erroneous.

EXAMPLE 11

Tanned, blue-dyed bovine leather (1.2-mm thick) from the same hide as in Example 7 was coated by the method of Example 7 using a 50-mil (0.13 cm) doctor knife, but with a polyurethane solution prepared from poly(ethylene-co-tetramethylene adipate) glycol (ethylene/tetramethylene moiety ratio 60/40), number-average molecular weight of ~4000 (short-path distilled from 3400 molecular weight polymeric glycol), 1-isocyanato-4-[(4'-isocyanatophenyl) methyl]benzene (2.1 mole ratio of diisocyanate to polyester glycol), ethylene diamine, and cyclohexylamine. No additives were used. The polyurethane solution was 18 wt % solids and had a Brookfield viscosity of 27,000 cps (spindle #3). Coated Sample A was 1.2-mm thick, and coated Sample B was 1.4-mm thick. Polyurethane coating levels (wt %, after drying) were 15 and 33, respectively. Test results are presented in Table XI.

TABLE XI

|  | Uncoated Leather | | Coated Leather | |
| --- | --- | --- | --- | --- |
|  | Initial | 12 mo old | Initial | 12 mo old |
| Sample A |  |  |  |  |
| Elongation (%) | 76 | 58 | 53 | 51 |
| Set (%) | 53 | 41 | 24 | 22 |
| Measure of Deformation | 0.69 | 0.71 | 0.41 | 0.43 |

TABLE XI-continued

| | Uncoated Leather | | Coated Leather | |
|---|---|---|---|---|
| | Initial | 12 mo old | Initial | 12 mo old |
| Sample B | | | | |
| Elongation (%) | 84 | 71 | 38 | 31 |
| Set (%) | 58 | 51 | 5 | 5 |
| Measure of Deformation | 0.69 | 0.72 | 0.14 | 0.16 |

The data in Table XI show that a polyesterurethane coating is also effective at improving the stretch properties of leather. Further, after 12 months' storage under the same conditions as in Example 7, both solution-coated leather samples retained high elongation and low measure of deformation.

EXAMPLE 12

Comparison

Tanned, blue-dyed bovine leather from the same hide as in Examples 7 and 11 was coated using a 50 mil doctor knife with a polyurethane aqueous dispersion intended for leather finishing ("Melio 03-P-25" from Clariant (Germany)). The amount of polyurethane applied was 16wt %.

| | Uncoated Leather | | Dispersion-Coated Leather | |
|---|---|---|---|---|
| | Initial | 18 mo old | Initial | 18 mo old |
| Elongation (%) | 40 | 46 | 37 | 10 |
| Set (%) | 27 | 31 | 13 | 2 |
| Measure of Deformation | 0.68 | 0.68 | 0.34 | 0.20 |

The initial (unaged) dispersion-coated sample displayed poor tactile aesthetics on the leather flesh side, which had a very rough surface. After 18 months' storage under the same conditions as in Example 7, the dispersion-coated leather had become very rigid (only 10% elongation, a decrease of 73% from its initial value), in sharp contrast to both the uncoated leather and to the solution-coated leather of the invention, as previously shown in Examples 7 and 11.

What is claimed is:

1. Coated natural leather comprising:
   (a) natural leather having at least 15% elongation prior to coating; and
   (b) 5–70 wt %, based on the weight of uncoated leather, of elastomeric polyurethane, from a polyurethane solution having a viscosity of 1,000–300,000 centipoise as measured at about 22° C., coated on the flesh side of the leather which is capable of absorbing the polyurethane solution, wherein the coated leather has an elongation of at least 15%, a set of no more than 25%, and a measure of deformation at least 0.05 lower than that of the leather prior to coating.

2. The coated leather of claim 1 wherein the polyurethane on the leather is about 15–55 wt % of the weight of the leather prior to coating, the coated leather having an elongation of at least 20% and a set of no more than 20%.

3. The coated leather of claim 1 wherein the polyurethane coating is deposited from a solution having a viscosity of 5000–200,000 centipoise as measured at about 22° C., the measure of deformation is no more than 0.5, and the polyurethane is a polyurethaneurea.

4. The coated leather of claim 1 wherein the elastomeric polyurethane has an interrupted pattern.

5. The coated leather of claim 1 in the form of footwear, apparel, apparel accessories, upholstery, or luggage.

6. The coated leather of claim 1 wherein the polyurethane on the leather is about 15–55 wt % of the weight of the leather prior to coating, the coated leather having a set of no more than 20% and a measure of deformation no more than 0.5.

7. A method for preparing coated natural grain leather comprising the steps of:
   (a) providing an elastomeric polyurethane solution having a viscosity of 1,000–300,000 centipoise as measured at about 22° C.;
   (b) providing natural leather having a grain side and a flesh side, and an elongation of at least 15%, wherein the flesh side is capable of absorbing the polyurethane solution;
   (c) coating the solution onto the flesh side of the leather in a quantity sufficient to afford 5–70% by weight, based on the weight of the leather prior to coating, upon drying the coating; and
   (d) drying the coating to afford coated leather having an elongation at least 15%, a set of no more than 25% and a measure of deformation of at least 0.05 lower than that of the uncoated leather.

8. The method of claim 7 wherein the polyurethane is a polyurethaneurea, the solution has a viscosity of 5000–200,000 centipoise as measured at about 22° C., the measure of deformation is no more than 0.5, and the coating is dried at a temperature of no more than about 75° C.

9. The method of claim 7 wherein the polyurethane coating is about 15–55 wt%, based on the weight of the leather prior to coating, the polyurethane is coated in an interrupted pattern, and the coated leather has an elongation of at least 20% and a set of no more than 20%.

10. The method of claim 7 comprising an additional step, after step (d), of making the coated leather into an article of footwear, apparel, apparel accessories, upholstery, or luggage.

* * * * *